US008677375B2

(12) United States Patent
Uysal et al.

(10) Patent No.: US 8,677,375 B2
(45) Date of Patent: Mar. 18, 2014

(54) SELECTING EXECUTING REQUESTS TO PREEMPT

(75) Inventors: Mustafa Uysal, Fremont, CA (US); Arif A. Merchant, Los Altos, CA (US); David Trastour, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 978 days.

(21) Appl. No.: 12/362,202

(22) Filed: Jan. 29, 2009

(65) Prior Publication Data
US 2010/0192153 A1 Jul. 29, 2010

(51) Int. Cl.
G06F 9/46 (2006.01)
(52) U.S. Cl.
USPC .......................................... 718/105; 710/39
(58) Field of Classification Search
None
See application file for complete search history.

(56) References Cited

U.S. PATENT DOCUMENTS

| 5,440,741 | A  | * | 8/1995  | Morales et al. ............... 718/103 |
| 6,009,452 | A  | * | 12/1999 | Horvitz ......................... 718/102 |
| 6,640,244 | B1 | * | 10/2003 | Bowman-Amuah .......... 709/207 |
| 6,707,792 | B1 | * | 3/2004  | Volftsun et al. ............... 370/235 |
| 6,801,502 | B1 | * | 10/2004 | Rexford et al. ............... 370/235 |
| 7,187,651 | B1 | * | 3/2007  | Volftsun et al. ............... 370/235 |
| 2005/0086659 | A1 | * | 4/2005 | Huras et al. ................... 718/104 |
| 2005/0235285 | A1 | * | 10/2005 | Monasterio ................... 718/100 |
| 2006/0126107 | A1 | * | 6/2006 | Cheung et al. ................ 358/1.15 |
| 2007/0118653 | A1 | * | 5/2007 | Bindal .......................... 709/226 |
| 2009/0049450 | A1 | * | 2/2009 | Dunshea et al. .............. 718/105 |
| 2010/0082603 | A1 | * | 4/2010 | Krompass et al. ............ 707/719 |
| 2010/0094999 | A1 | * | 4/2010 | Rama et al. ................... 709/225 |

* cited by examiner

Primary Examiner — Andrew Caldwell
Assistant Examiner — George Giroux

(57) ABSTRACT

Systems, methods, and computer-readable and executable instructions are provided for selecting executing requests to preempt. Selecting executing requests to preempt can include determining whether an application is in an overload condition. Selecting executing requests can also include in response to determining the application is in an overload condition, identifying each request that is being executed by the application. Selecting executing requests can also include determining a value for each request that is executing. Furthermore, selecting executing requests can also include selecting executing requests to preempt based on the values for the requests.

11 Claims, 3 Drawing Sheets

SELECTING EXECUTING REQUESTS TO PREEMPT

BACKGROUND

When applications are in an overload situation, the service levels of all users of that application are typically not met. Examples of applications that accept requests and may enter into an overload situation due to a high rate of requests include a database application, a web server application, a financial transaction application, enterprise application, business intelligence application, etc. These type of applications often have service levels associated therewith, such as response time. The service levels may be specified in service level agreement (SLAs), and a service provider, for example, hosting the applications, may be subject to penalties if the service levels are not met. When these applications are in an overload situation the service levels may not be met.

Request throttling is a common mechanism used to mitigate application overload situations by limiting the rate at which new requests are accepted. Request throttling can be effective; however, there are several cases where throttling only newly received requests might lead to long recoveries from an overload situation. For example, if there are long running requests, it would take a long time for them to finish, and so long as they are executing, the overload situation persists. This reduces the efficiency of throttling-based mechanisms as their effects are not observed until a sufficient number of long-running requests complete.

BRIEF DESCRIPTION OF DRAWINGS

The embodiments of the invention will be described in detail in the following description with reference to the following figures.

DETAILED DESCRIPTION OF EMBODIMENTS

Figure 1:
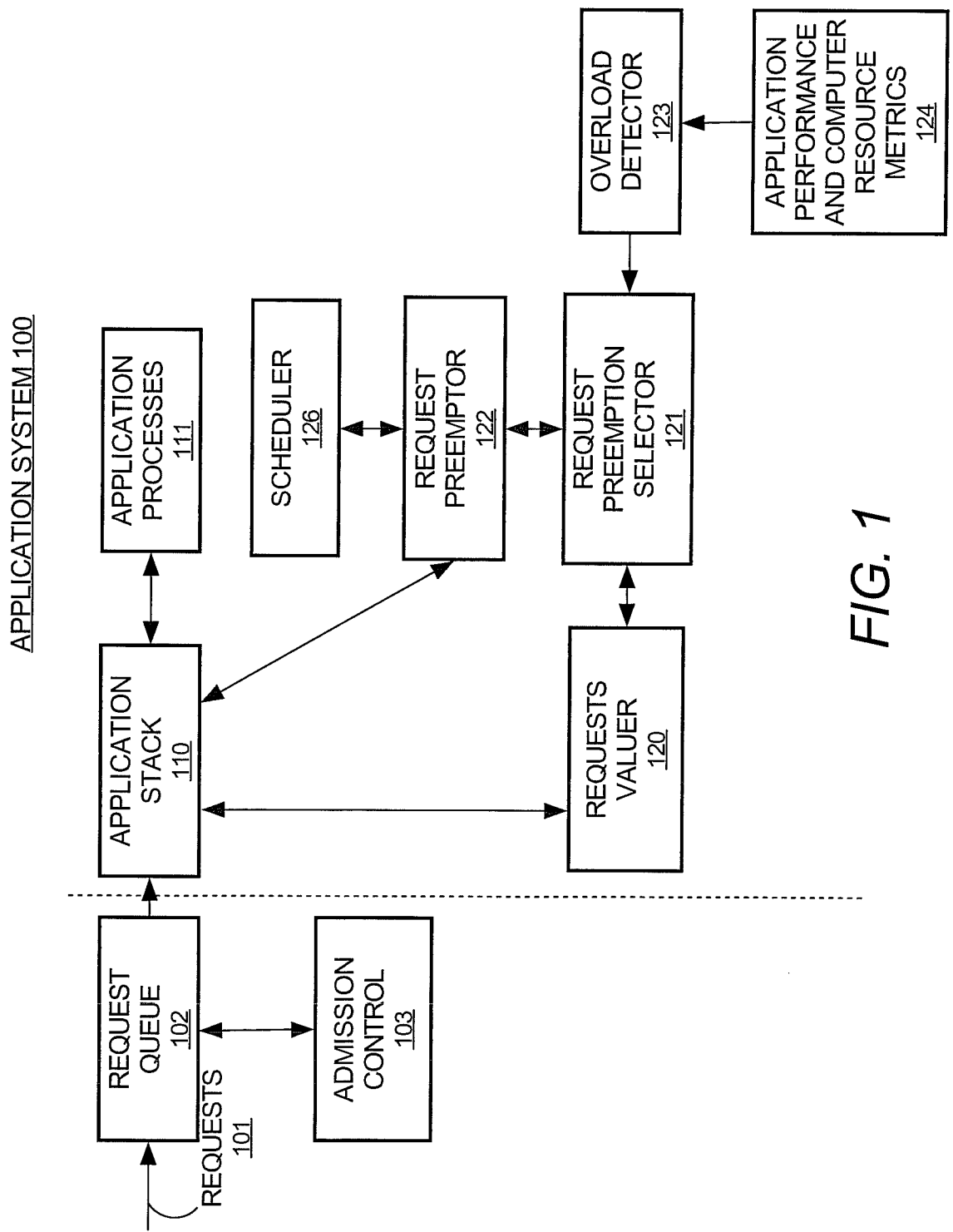
FIG. 1 illustrates a system, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Existing request throttling mechanisms only consider throttling of new requests by limiting the rate at which the new requests are admitted to the system or denying any new requests. According to an embodiment, a selection process is performed for selecting requests already in the system to preempt, thereby improving the recovery times in the event of an application overload situation. Preempting may include suspending or terminating requests. The preempted requests may be prioritized and rescheduled for execution.

When an application is in an overload situation, a throttling approach is used to counter the overload situation that involves selectively preempting requests that are executing. Requests that are executing are requests that leave an admission queue and enter a processing state. The admission queue is where newly requests are stored prior to admission and execution. A processing state is entered when the request is admitted for processing. This may include creating and running a process or thread to execute the request. This may include submitting the request to one or more tiers of a multi-tier application, such as in an enterprise application. Some systems may include an admission control system that controls which requests in the queue are admitted for processing. After a request is accepted by an admission control system, the request may be executed by an application in an application stack, and at this point is considered to be executing. An application may be a single application, such as a database or web server application, or an application may be a multi-tier application, such as an enterprise system including a web server application, database application, and business intelligence applications.

The selective preemption of executing requests may be based on one or more criteria. Examples of the criteria include utility measure for each executing request, a residual lifetime for each executing request, and an amount of executing time for each executing request, or a combination of criteria. Each executing request may be individually evaluated to determine whether to preempt the request. The selective preemption of executing requests speeds up the recovery of an application from an overload condition to its normal service levels by preempting executing requests that may extend the overload condition even when new requests are not admitted for execution. This may include preempting long-running or resource-intensive applications that are causing the overload condition.

FIG. 1 illustrates an application system 100 configured to preempt executing requests when an application overload condition exists, according to an embodiment. The system 100 includes a request queue 102 storing requests 101 received for an application. For example, for a database, requests may be queries. An admission control system 103 determines whether to admit requests in the request queue 102 for execution. If an overload condition exists, the admission control system 103 may not allow requests in the request queue 102 to be admitted for execution.

After a request is admitted for execution, the request is processed by the application. This may include identifying the application in an application stack 110. The application stack 110 is a list of applications, for example, that may be used by an organization or a system. Application processes 111 are processes or threads for executing requests for an application in the application stack 110. An application process may be a thread created to execute a request, such as run a query.

The system 100 also includes a request valuer 120, a request preemption selector 121, a request preemptor 122, an overload detector 123, and a scheduler 126. The overload detector 123 determines when an application overload condition exists based on application metrics 124. The application metrics 124 may include one or more of performance metrics related to predetermined service levels and computer resource metrics, such as CPU usage. The application metrics 124 may be measured by conventional performance measurement tools. In one example, service levels, which may be specified in an SLA, are used to determine when an overload condition exists. If service levels are approaching or exceeding thresholds, then the application may be considered to be in an overload condition. This may happen in response to a sudden burst of requests.

If the overload detector 123 determines an application overload condition exists for an application in the application stack 110, the request valuer 120 determines a value for each executing request for the application based on one or more criteria. The request preemption selector 121 selects one or more of the executing requests to preempt based on the values. The selected requests are preempted by the request preemptor 122. This includes terminating or suspending a request. An executing request may be terminated by killing a thread for the request. An executing request may be suspended by storing a current state of the request and halting the execution of the request. Storing the state may include storing information determined at the point of halting the execution. For example, if a request is a database query, the database may be able to identify records that match query and records that have been reviewed for the query. Then, the query can be started again from the point it was halted, such as after the overload condition is fixed. The scheduler 126 may reschedule terminated or suspended requests for execution later when the application's overload condition ceases, and the request preemptor 122 can restart those requests when scheduled.

Figure 2:
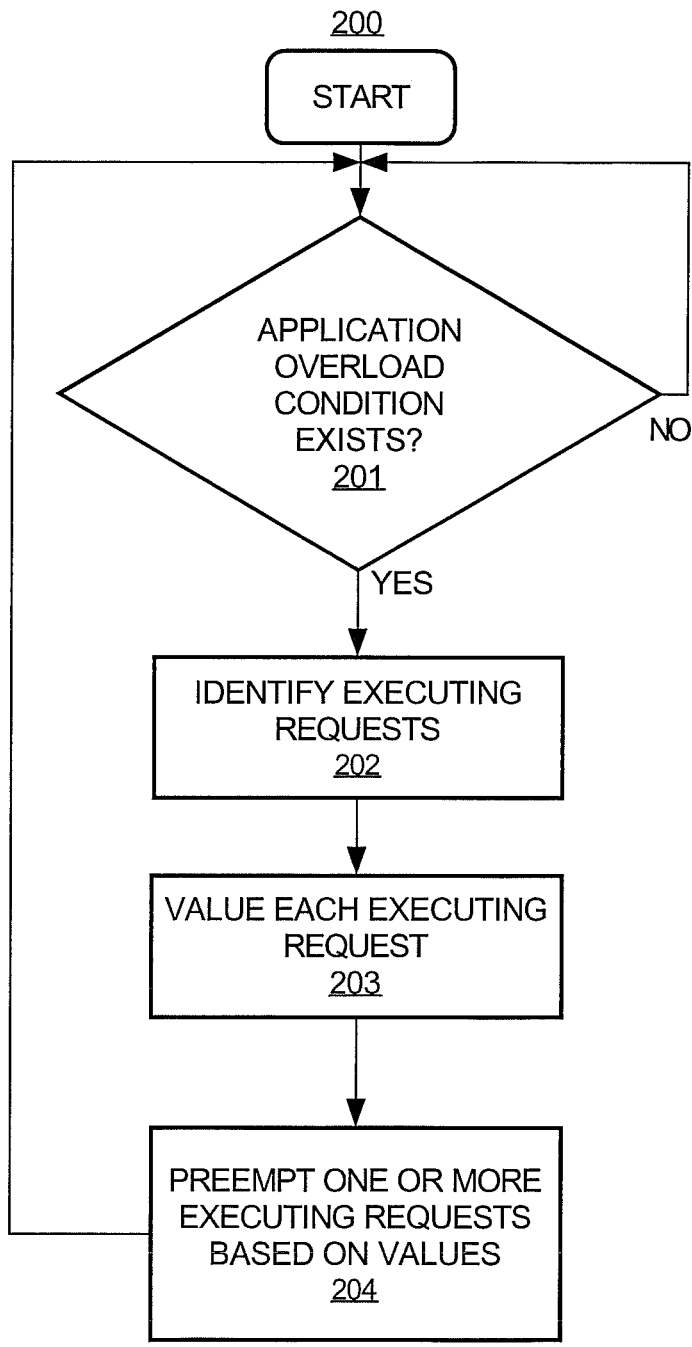
FIG. 2 illustrates a method for selecting requests to preempt, according to an embodiment.

FIG. 2 illustrates a method 200 for selectively preempting application requests that are executing, according to an embodiment. The method 200 is described with respect to FIG. 1 by way of example and not limitation. the method 200 may be performed in other systems.

At step 201, a determination is made as to whether an application overload condition exists. The metrics 124 and predetermined service levels may be used to determine whether an application overload condition exists. For example, if one or more measured metrics do not satisfy one or more service levels or other thresholds, the application may be in an overload condition.

At step 202, if an application overload condition exists, each request that is being executed is identified. This includes identifying requests being executed by the application. This may include requests executed by another application running on the same computer system. This may include identifying processes or threads executing the requests for the applications.

At step 203, a value for each request that is executing is determined. The value may be based on one or more criteria, including a calculated utility measure for each executing request, a residual lifetime for each executing request, and amount of executing time for each executing request.

A utility measure is a measure of benefit obtained by completing the executing request. In one example, it is based on one or more service levels in an SLA, and can be considered the value or benefit of completing a request given the SLA. For example, some SLAs may impose a monetary penalty, such as paid less for application hosting services, if service levels are not met. If a request is suspended, the SLA may indicate that the datacenter hosting the application gets paid less because a service level is not met. The benefit or utility measure for completing this request would be higher than a request that would not have such penalties imposed. Utility may also be determined for different applications and different requests. For example, some applications may have a priority for a business and requests for these applications are given a higher priority over requests for other applications. In another example, an initiator of a request may be given a higher priority over another initiator.

The amount of executing time for each executing request is a measure of the amount of time a request has been executing. A request that has been executing a least amount of time may be more likely preempted than a request that has been executing longer. This may be based on the assumption that a request that has been executing longer may need less time and resources to complete. In some situations, requests, such as long-running queries, may take longer to complete than younger requests. If information is known about the length of time a request needs to be completed, which may be based on a history of previous requests that were the same or similar, this information can be used to determine the length of time the request needs to be completed. This provides an opportunity to finish up the requests that are near completion.

The residual lifetime is an estimate of an amount of computer resources a request will consume until it is completed. Requests that will consume the most resources are preempted first according to this criterion. This allows the fastest reduction in the resources used by the application stack during the overload condition. The amount of computer resources needed to complete the request may be based on a history of similar requests that have been executed or other information about the requests.

A combination of criteria, such as the criteria described above, may be used to determine the value of each executing request. In one example, a combination of the utility and residual lifetime criteria is used to determine the value of each executing request. The utility and the residual lifetime are determined for an executing request. The utility may be given as an input to the system, or, in the case of an SLA-based system, be based on the penalties for not completing the request. The residual lifetime estimate may be based on request characteristics, such as the initiator, size, actions performed, resources reserved or used so far, etc., and may be estimated using a model, such as a constructive model of the request, or a model based on the history of past transactions. In addition, when the request in a multi-tier application will consume the resources from multiple tiers, the residual life estimate may be a composite (e.g., a sum) of component residual life estimates at the various tiers. Alternatively, it may be a composite of the residual life estimates only at tiers that are overloaded. In another example of a combination of criteria that may be used to determine the value of each executing request, the value may be determined using a combination of the utility of the request, the amount of time or other resources it has so far consumed from each of the tiers in a multi-tier application, the estimates of its residual lifetime at each of the tiers, and the load levels at each of the tiers.

A model for estimating the residual lifetime of a request may predict either the entire probability distribution of the residual life or some parameters of it such as the mean or the median. Given this information, an estimate of the utility per resource unit consumed is determined. The residual lifetime may be estimated as follows. Denote the utility of request i as $u_i$, the probability density function of the residual lifetime $R_i$ as $f_i(x)$, and the mean utility per unit (additional) resource consumed as $B_i$. Then, $E[B_i]=E[u_i/R_i]=u_iE[1/R_i]$. If the distribution of $R_i$ can be estimated, then $E[1/R_i]=\int f_i(x)dx/x$; otherwise, it can be approximated as $1/E[R_i]$. Then the overload condition can be reduced to the degree desired by preempting transactions with the lowest value of $E[B_i]$. Thus, the probability distribution can be used to estimate mean utility per additional resource consumed. Examples of mean utility per resource consumed may be $5/CPU hour or $2/CPU hour.

At step 204, one or more executing requests are preempted based on the values for the requests. For example, if higher values are indicative of requests that require the most amount of computer resources to complete or require the most amount of time to complete, a set of requests having the highest values are preempted. Alternatively, if the values are indicative of the amount of benefit received per unit of additional resource consumption, then the requests with the lowest value may be preempted. Requests are preempted until the overload condition does not exist. After the overload condition is fixed, suspended requests may be restarted. Also, suspended requests may be rescheduled for completion at a later time.

As described above, preemption may include suspending or terminating a request. Suspending a request may be preferred because the request would not have to be re-executed from the beginning. However, some requests cannot be suspended. For example, if an executing request was for a financial transaction, the request may not be able to be suspended, because another party may be waiting for a transfer of funds, or a purchase confirmation. In these instances, the request is either terminated (aborted) or completed.

Figure 3:
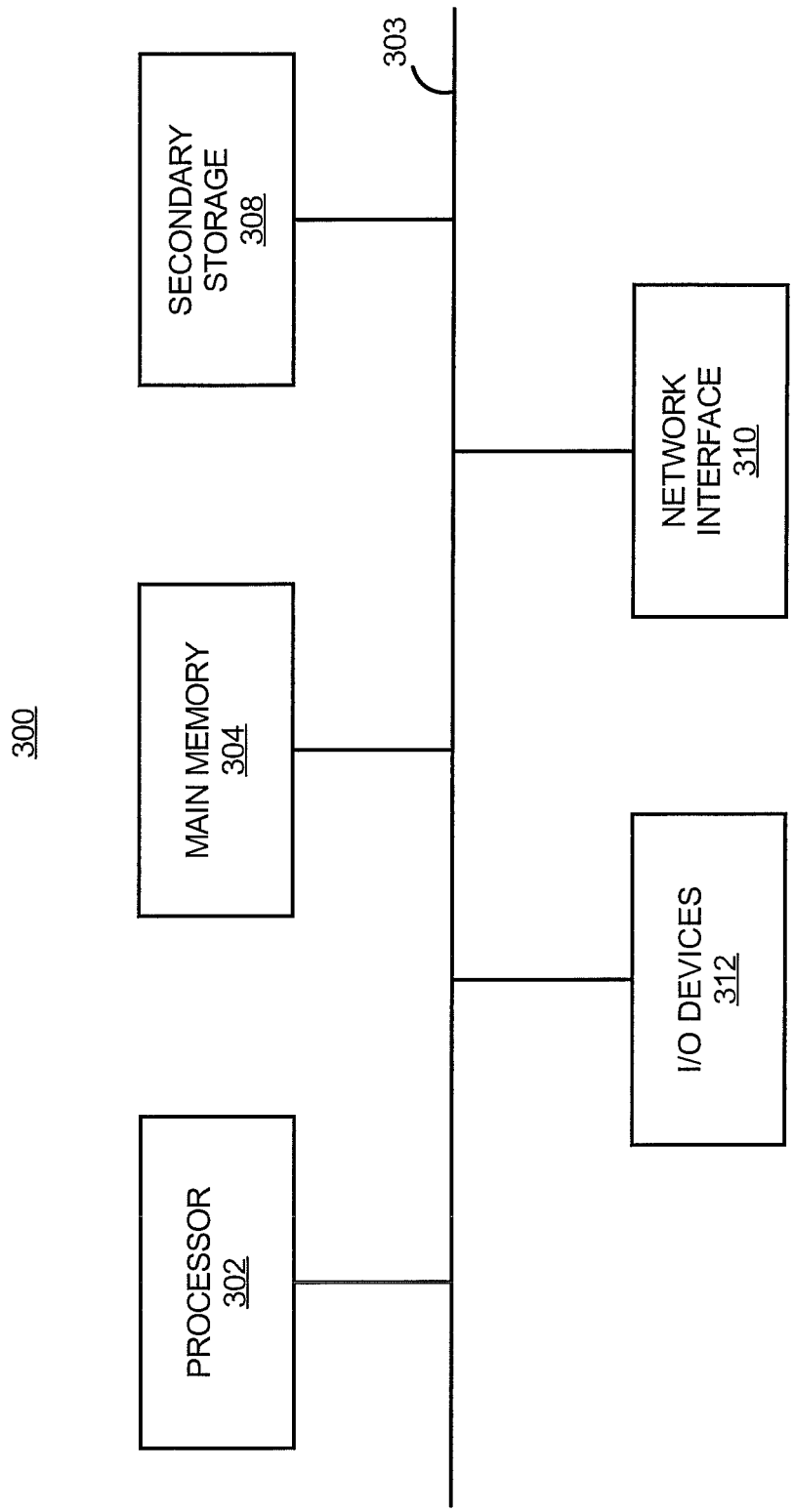
FIG. 3 illustrates a computer system that may be used a platform for the systems and methods of the embodiments.

FIG. 3 illustrates a block diagram of a general purpose computer system 300 that is operable to be used to execute one or more computer programs implementing the embodiments described herein, including steps described herein. The computer system 300 may be used as a platform for the system 100. It will be apparent to one of ordinary skill in the art that a more sophisticated computer system is operable to be used. Furthermore, components can be added or removed from the computer system 300 to provide the desired functionality.

The computer system 300 includes one or more processors, such as processor 302, providing an execution platform for executing software. Commands and data from the processor 302 are communicated over a communication bus 303. The computer system 300 also includes computer readable storage mediums including a main memory 304, such as a Random Access Memory (RAM), where software is resident during runtime, and a secondary storage 308. The secondary storage 308 includes, for example, a hard disk drive and/or a removable storage drive representing a floppy diskette drive, a magnetic tape drive, a compact disk drive, etc., or a non-volatile memory where a copy of the software is stored. In one example, the secondary storage 308 also includes ROM (read only memory), EPROM (erasable, programmable ROM), EEPROM (electrically erasable, programmable ROM). The computer system 300 includes one or more input/output (I/O) devices 312, such as a display, keyboard, a mouse, a stylus, and the like. A network interface 310, wired and/or wireless, is provided for communicating with other computer systems.

One or more of the steps of the methods described herein and other steps described herein and one or more of the components of the systems described herein may be implemented as software code stored on a computer readable medium, such as the memory and/or secondary storage, and executed on a computer system, for example, by a processor. For example, the steps of the embodiments may exist as software program(s) comprised of program instructions in source code, object code, executable code or other formats for performing some of the steps. Any of the above may be embodied on a computer readable medium, which include storage devices. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes.

While the embodiments have been described with reference to examples, those skilled in the art will be able to make various modifications to the described embodiments without departing from the scope of the claimed embodiments.

What is claimed is:

1. A non-transitory computer readable medium including code that when executed by a computer system performs a method of selecting application requests that are executing to preempt, the method comprising:

determining whether an application is in an overload condition;

in response to determining the application is in an overload condition, identifying each request that is being executed by the application;

determining a value for each request that is executing, wherein determining the value comprises calculating a utility measure, calculating an amount of executing time, and estimating a probability distribution of a residual lifetime for each request;

utilizing the probability distribution for estimating a utility per unit consumed by each request and utilizing the probability distribution for estimating a mean utility per additional resource consumed, wherein the mean utility per additional resource consumed includes a quantity of financial resource per additional resource consumed;

determining a mean utility per resource consumed to complete the request based on the probability distribution as the value; and selecting executing requests to preempt based on the values for the requests.

2. The computer readable medium of claim 1, wherein the method further comprises:

preempting the selected requests.

3. The computer readable medium of claim 2, wherein preempting comprises suspending or terminating the selected requests.

4. The computer readable medium of claim 3, wherein the method further comprises:

determining whether to terminate or suspend a selected executing request based on a type of the request.

5. The computer readable medium of claim 1, wherein determining a value for each request that is executing comprises:

determining a value for each request that is executing based on residual lifetimes for the requests, consumed resources or execution time of each request, and load levels at multiple tiers of the application.

6. The computer readable medium of claim 1, wherein each request includes requests being executed by the application on a computer system and requests being executed by one or more other applications running on the computer system.

7. The computer readable medium of claim 1, wherein determining whether an application is in overload condition further comprises:

determining whether an application is in overload condition based on predetermined service levels.

8. The computer readable medium of claim 1, wherein a request that is executing comprises a request that leaves an admission queue for the application and enters a processing state.

9. A computer system comprising:

a processor executing requests for an application;

an overload detector detecting when the application is in an overload condition;

a request valuer determining a value for each request that is executing when the overload detector detects the overload condition, wherein determining the value comprises calculating a utility measure, calculating an amount of executing time, estimating a probability distribution of a residual lifetime for each request, utilizing the probability distribution for estimating a utility per unit consumed by each request and utilizing the probability distribution for estimating a mean utility per additional resource consumed, wherein the mean utility per additional resource consumed includes a quantity of financial resource per additional resource consumed, wherein the request valuer determines a mean utility per resource consumed to complete the request based on the probability distribution as the value; and a request preemption selector selecting one or more of the executing requests to preempt based on the values for the executing requests.

10. The computer system of claim 9, further comprising:

a request preemptor suspending or terminating the selected requests.

11. A non-transitory computer readable medium including code that when executed by a computer system performs a method of selecting application requests that are executing to preempt, the method comprising:

determining whether an application is in an overload condition based on service levels specified in a service level agreement;

in response to determining the application is in an overload condition, identifying each request that is being executed by the application, wherein a request that is being executed is a request that leaves an admission queue and enters a processing state;

determining a value for each request that is executing, wherein determining the value comprises calculating a utility measure, calculating an amount of executing time, and estimating a probability distribution of a residual lifetime for each request;

utilizing the probability distribution for estimating a utility per unit consumed by each request and utilizing the probability distribution for estimating a mean utility per additional resource consumed, wherein the mean utility per additional resource consumed includes a quantity of financial resource per additional resource consumed;

determining a mean utility per resource consumed to complete the request based on the probability distribution as the value; and selecting executing requests to suspend or terminate based on the values for the requests.

* * * * *